United States Patent [19]

Russell

[11] Patent Number: 5,048,898
[45] Date of Patent: Sep. 17, 1991

[54] WHEEL COVER TWIST FASTENER SYSTEM

[75] Inventor: Martin E. Russell, White House, Tenn.

[73] Assignee: Del-Met Corporation, Walton, N.Y.

[21] Appl. No.: 549,979

[22] Filed: Jul. 6, 1990

[51] Int. Cl.⁵ .............................................. F16B 19/00
[52] U.S. Cl. ................................. 301/37 S; 301/37 P; 301/108 S; 411/429
[58] Field of Search .................. 301/37 P, 37 R, 37 S, 301/108 A, 108 R, 108 S; 411/371, 372, 373, 377, 429

[56] References Cited

U.S. PATENT DOCUMENTS

| | | | |
|---|---|---|---|
| 4,582,462 | 4/1986 | Thiel | 411/377 X |
| 4,787,681 | 11/1988 | Wang et al. | 301/108 S X |
| 4,890,967 | 1/1990 | Rosenbaum | 411/377 X |
| 4,895,415 | 1/1990 | Stay et al. | 301/37 P X |
| 4,907,929 | 3/1990 | Johnston, Jr. | 411/377 X |

FOREIGN PATENT DOCUMENTS 1327391 8/1973 United Kingdom .

Primary Examiner—Russell D. Stormer
Attorney, Agent, or Firm—Natter & Natter

[57] ABSTRACT

A molded thermoplastic lug nut cap suitable for mounting wheel covers includes a hollow cylindrical body. Axially projecting from the body is a crown having a plan configuration congruent with a lug nut. The fastener is slipped over a lug nut which extends through an opening in the wheel cover and abuts against the wheel cover. A lug wrench is employed to twist the cap relative to the lug nut. The internal walls of the body include a plurality of chordal planar faces extending parallel to the axis of the cap with diagonally opposed chordal faces being positioned apart a distance greater than diagonally opposed faces of the lug nut but less than the distance between diagonally opposed corners of the lug nut. When the cap is twisted relative to the nut, corners of the nut engage and lock against the chordal faces in interference fit. An abutment rib project radially inwardly from each chordal face and provides a positive rotation stop when contacted by the face of the nut.

14 Claims, 2 Drawing Sheets

5,048,898

WHEEL COVER TWIST FASTENER SYSTEM

BACKGROUND OF THE INVENTION

1. Field of the Invention

This invention relates generally to motor vehicle trim and more particularly to wheel cover retention systems.

2. Background History

Traditionally, utility vehicle wheels were mounted to wheel hubs by lugs and lug nuts which remained exposed. In automotive applications, however, an early practice was to cover the wheel hub and lug nuts with a hub cap mounted to a central dish area of the wheel. The hub cap covered and protected the lug nuts and wheel bearings from the corrosive effects of moisture, sand, dirt and road chemicals. The advent of wheel covers, which served to conceal the outer face of a wheel up to the wheel rim, presented challenges with respect to providing secure mounting systems.

Some suggested mounting arrangements appreciated the fact that the wheel lug nuts could be utilized to hold the wheel cover against the wheel. In United Kingdom patent document no. 1,327,391 a wheel cover included selected openings registered with the wheel lug nuts which were of a size greater than the lug nuts and selected openings of a smaller size which permitted the wheel cover to slip over the lugs only. The lug nuts registered with the smaller sized openings were removed, the wheel cover then positioned against the wheel and the lug nuts were replaced to fasten the cover.

Among the disadvantages encountered with such system was the fact that at least some lug nuts were required to be removed in order to mount or dismount the wheel cover. Further, the wheel lug nuts were exposed to the corrosive effects of the road environment. Additionally, exposed conventional steel lug nuts presented an unsightly appearance in contrast to polished wheel covers.

Irrespective of attempts to utilize lug nuts for securing wheel covers, the general employment of exposed wheel lug nuts in passenger vehicle applications has increased in recent years. Among contributing factors have been the increased popularity of aftermarket chromed or cast metal dress wheels and the prevalence of OEM option and standard equipment cast wheels. Such applications necessitated the use of chromed wheel lug nuts which significantly increased costs as compared to conventional lug nuts.

While some cost savings have been achieved through the use of chromed metal lug nut covers as illustrated in copending U.S. Pat. application Ser. No. 07/483,748 filed Feb. 22, 1990 and assigned by the assignee of the present invention, chromed metal lug nut covers were themselves quite costly, e.g. several times the cost of the conventional lug nuts which they protected. Further, chromed metal covers could be dislodged with relative ease.

SUMMARY OF THE INVENTION

The present invention comprises a twist fastener system for wheel covers which includes injection molded thermoplastic wheel lug nut caps. The caps have a hollow cylindrical body and an axial crown with a polygon plan configuration congruent with the lug nut to be covered and gripped.

The inner walls of the cap body include a plurality of chordal planar faces parallel to the longitudinal axis of the cap. Diagonally opposite faces are spaced apart a distance greater than diagonally opposed faces of the lug nut but less than the distance between the diagonally opposed corners of the lug nut.

The cap is slipped axially over the lug nut and then twisted with a lug nut wrench applied to the crown for interference gripping engagement between the chordal faces and the nut corners. An abutment rib is formed on each chordal face for engagement with the nut face to provide a positive stop.

A wheel cover having lug nut openings of a size sufficient to accommodate the lug nuts is positioned against a wheel and secured with the lug nut caps. The nut cap body includes a peripheral skirt having a diameter larger than the diameter of the lug nut openings in the wheel cover to retain the wheel cover against the wheel.

The caps may also be employed to protect and provide a dress appearance for conventional lug nuts used in cast or chromed wheel applications.

From the foregoing compendium, it will be appreciated that it is an aspect of the present invention to provide a wheel cover fastener system of the general character described which is not subject to the disadvantages of the background history aforementioned.

It is a further aspect of the present invention to provide a wheel cover fastener system of the general character described which is low in cost and simple to use.

A feature of the present invention is to provide a wheel cover fastener system of the general character described which is well suited for economical mass production injection molding fabrication.

An aspect of the present invention is to provide a lug nut cap of the general character described having positive locking engagement with a lug nut and which is not subject to inadvertent dislodgement.

A further feature of the present invention is to provide a lug nut cap of the general character described which is well suited to meet the rigors of land vehicle wheel applications.

A consideration of the present invention is to provide a molded thermoplastic lug nut cap of the general character described having a rheology suited for secure locking engagement with vehicle lug nuts.

Another consideration of the present invention is to provide a molded thermoplastic lug nut cap of the general character described which is configured for resistance to overtightening.

Other aspects, features and considerations in part will be obvious and in part will be pointed out hereinafter.

With these ends in view, the invention finds embodiment in certain combinations of elements, arrangements of parts and series of steps by which the said aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention, FIG. 1 comprises an axial elevational view of a lug nut cap constructed in accordance with and embodying the invention and with a portion of the cap broken away and showing a wheel lug and lug nut with the cap being illustrated in a position prior to interlocking engagement with the lug nut for fastening a wheel cover.

DESCRIPTION OF THE PREFERRED EMBODIMENT

Figure 1:
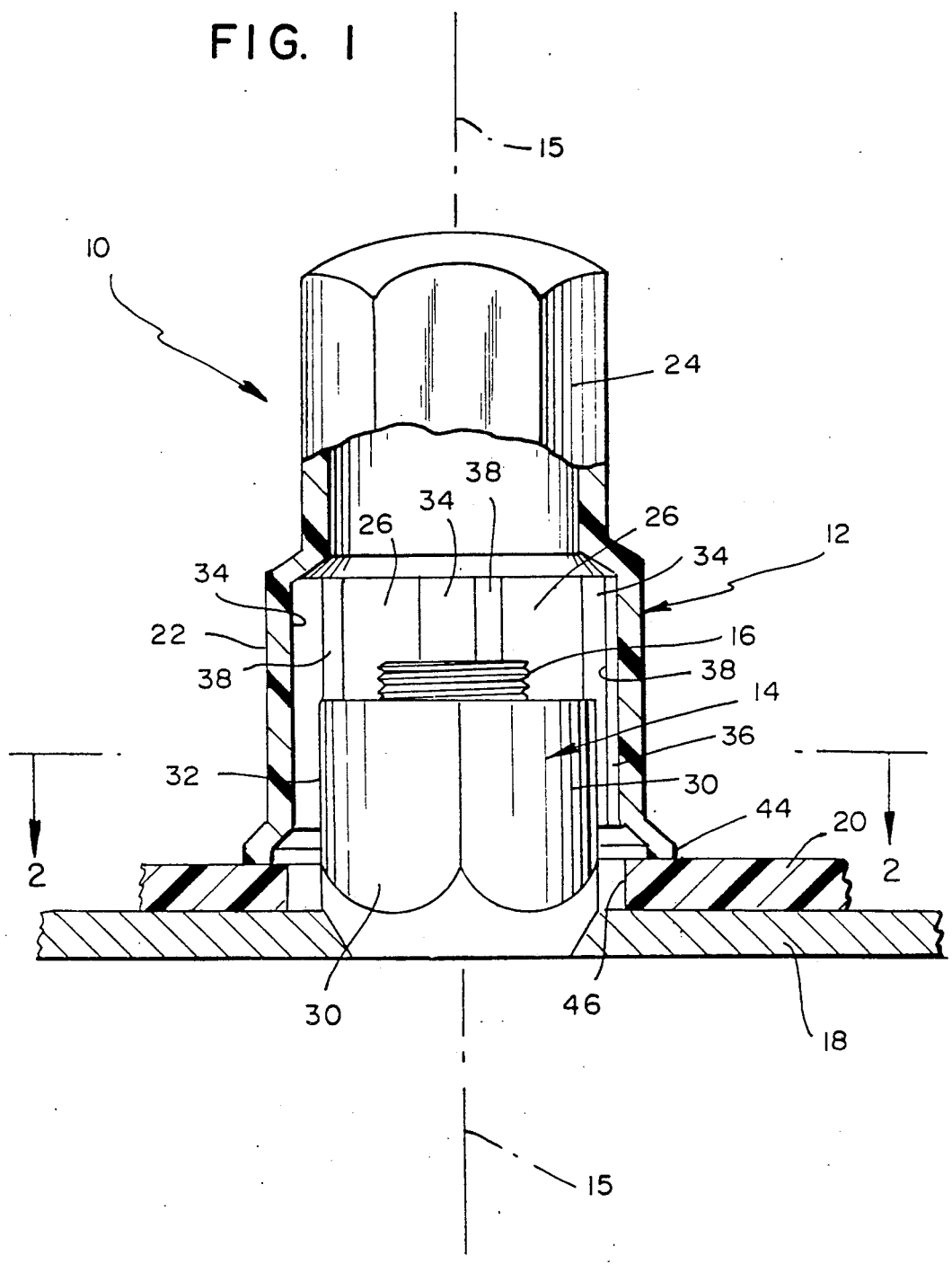

Referring now in detail to the drawings, the reference numeral 10 denotes generally to a twist fastener system constructed in accordance with and embodying the invention. The fastener system 10 includes a plurality of injection molded thermoplastic lug nut caps 12 configured to be axially slipped over a lug nut 14 which is in engagement with a wheel lug 16 for mounting a vehicle wheel 18. In accordance with the invention, a plurality of lug nut caps 12 are utilized for mounting a wheel cover 20 to the wheel 18.

Each cap 12 includes a substantially cylindrical body 22. Molded unitarily with the cap body 22 and projecting axially outwardly therefrom is a crown 24 having a plurality of planar faces. The crown includes a rounded distal tip and a tapered shoulder is provided at the intersection between the crown and the body 22. The cap is thus configured with a smooth, easily washable outer surface.

Figure 2:
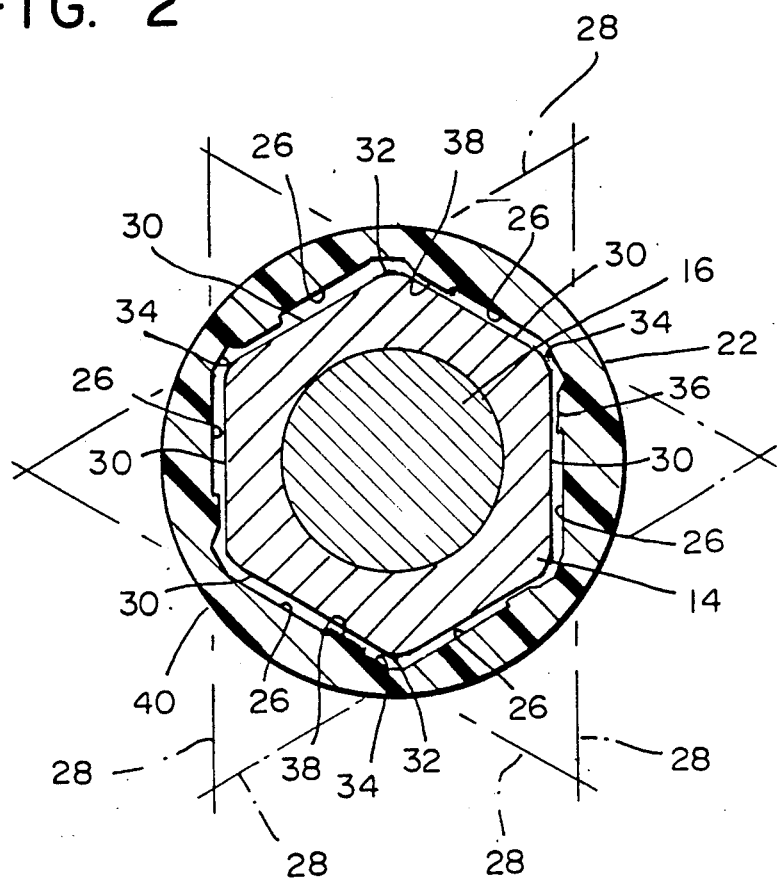
FIG. 2 is a sectional view through the cap, the lug nut and the lug, the same taken substantially along a line 2—2 of FIG. 1.

With reference now to FIG. 2, it will be seen that the inner walls of the cap body 22 are configured with a plurality of chordal planar faces 26, each face lying within a plane 28 shown in dot and dash lines in FIG. 2. The chordal planes 28 extend substantially parallel to a longitudinal axis 15 of the lug 16 and the cap 12. Diagonally opposite chordal planes 28 are parallel to one another.

Confined within the body 22 is the lug nut 14 having a plurality of planar faces 30 which intersect at junctures comprising somewhat rounded corners 32.

In accordance with the invention, the distance between each chordal face 26 of the cap body 22 and the longitudinal axis 15 is greater than the distance between the corresponding face 30 of the nut 14 and the longitudinal axis 15, i.e. the distance between diagonally opposed chordal planes 28 is greater than the distance between diagonally opposed nut faces 30.

It should be noted that for structural strength, thickened areas or fillets 34 are formed in the wall of the cap body 22 at the intersecting corners of the chordal faces 26.

A radially inwardly projecting abutment rib 36 is provided on each of the chordal faces 26 adjacent the fillet 34. Each abutment rib 36 includes a planar face 38 which extends along a plane parallel to the chordal plane 28 of its corresponding chordal face 26. The face 38 of each abutment rib 36 lies in a plane spaced from the longitudinal axis 15 a distance greater than the distance between the corresponding nut face 30 and the longitudinal axis 15. Thus, the abutment ribs 36 will not interfere with slipping a lug nut cap 12 over a lug nut 14.

Turning again to FIG. 1, it should be noted that the crown 24 includes a plurality of planar faces which are equal in number to the faces of the lug nut 14 and which are congruent, in polygon plan configuration, to the lug nut 14. As a result, a lug nut wrench used to tighten or loosen the lug nut 14 may be employed to secure or remove the cap 12.

Figure 3:
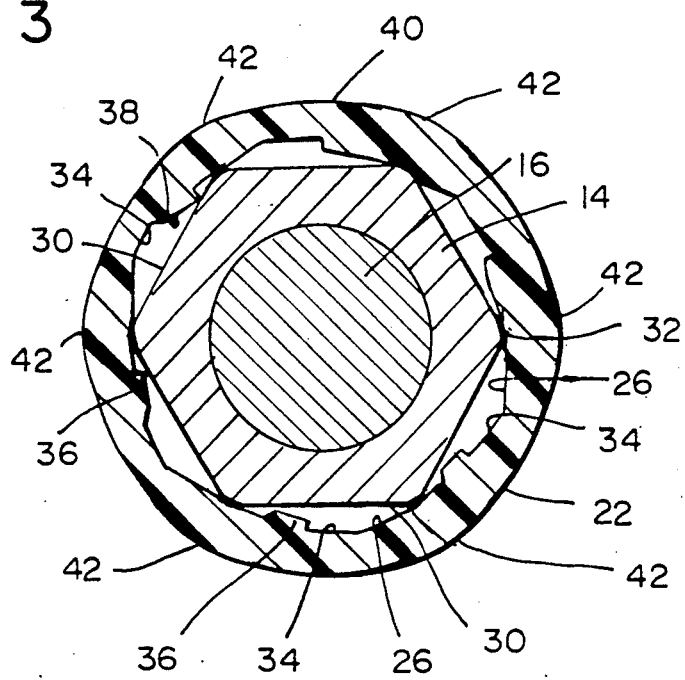
FIG. 3 is a sectional view through the cap, the lug nut and the lug similar to FIG. 2 but showing the cap after being twisted into engagement with the lug nut.

To lock the lug nut caps 12 against the lug nut 14, the lug wrench engages the crown 24 to rotate the cap 12 from its initial position, shown in FIG. 2, in a clockwise direction, approximately 30 degrees (for a hexagonal nut) to a locked position illustrated in FIG. 3. In the locked position, the nut corners 32 bear against the chordal faces 26 in an area adjacent the center of the chordal length, hence an area of maximum wall thickness. Because the radial distance of each of the lug nut corners 32 from the longitudinal axis 15 is greater than the radial distance of the plane 28 of each chordal face 26, an interference fit results. A normally circular circumferential plan outline 40 of the body 22 becomes slightly radially outwardly deformed with a bulge 42 registered with each of the points of interference.

As previously mentioned, a positive stop to clockwise locking rotation of the lug nut cap 12 is provided by the abutment ribs 36 which include a shoulder, the radially innermost edge of which abuts a nut face 30.

It should be appreciated that the lug nut cap 12 is suitably injection molded of a thermoplastic having the strength which will not lose its retentive grip on the nut after extended periods of usage at elevated temperatures which are encountered as a result of tire-road contact and brake usage.

Suitable thermoplastics for use in the lug nut cap 10 include polyamids such as super high temperature 4-6 nylon, Zytel ST801 (nylon) with rubber added as an impact modifier or polyesters, all by way of example only and not limitation. Lug nut caps molded of Zytel ST801 with rubber have maintained locking engagement with lug nuts at elevated temperatures up to 330° F. For higher temperature applications, high temperature 4-6 nylon would be among appropriate alternative thermoplastics. A platable nylon or a high temperature acrylonitrile-butadyene-styrene (ABS) which may be metal plated to provide a simulated chrome lug nut appearance may also be employed. In lieu of metal plating, colorants such as color pigments may be added to the thermoplastic prior to molding. It should also be appreciated that the mold configuration and thermoplastic employed is selected to provide a molded lug nut cap with optimum rheology characteristics.

With reference again to FIG. 1, it should be noted that adjacent the open bottom of the cap, the lug nut body 22 includes an outwardly flared skirt 44, the lower edge of which is in abutting contact with the wheel cover 20.

In accordance with the invention, the wheel cover 20 includes a plurality of lug nut openings, 46 each of which has a diameter larger than the distance between diagonally opposed nut corners 32 such that the entire wheel cover may be slipped over all of the lug nuts and positioned against the wheel 18. The wheel cover 20 is secured or fastened by sliding the lug nut caps 12 over their respective lug nuts with the lower edge of the skirt 44 in abutment against the wheel cover 20. Thereafter, each of the lug nuts is twisted to a tightened position wherein the chordal faces 26 are in interference fit engagement against the nut corners 32.

To remove the lug nut caps 12, one merely needs to employ a lug wrench to grip the crown 24 and rotate the crown in a counterclockwise direction, freeing the nut corners 32 and returning the lug nut cap 12 to the position, relative to the lug nut 14, shown in FIG. 2. Thereafter, each lug nut cap may be manually slipped off the lug nut.

As previously mentioned, the lug nut caps 12 of the present invention need not be utilized solely for the purpose of fastening wheel covers and may be employed for lug nuts in chromed or cast wheel applications to provide a dress appearance for conventional steel lug nuts and protect such lug nuts against corrosion.

Thus it will be seen that there is provided a twist fastener which achieves the various aspects, features, and considerations of the present invention and which is well suited to meet the conditions of practical usage.

As various possible embodiments of the invention may be made and as various changes may be envisioned in the exemplary embodiment described herein, it is to be understood that all matter herein described or shown in the accompanying drawings is to be interpreted as illustrative and not in a limiting sense.

Having thus described the invention there is claimed as new and desired to be secured by Letters Patent:

1. A molded thermoplastic nut cap for locking engagement over the corners of a polygonal nut, the cap comprising a substantially cylindrical body having an open bottom, a plurality of planar chordal faces formed on an interior wall of the body, the polygonal nut having a plurality of faces and a plurality of corners, each corner of the nut formed at the intersection of adjacent faces of the nut, the plurality of chordal faces comprising the number of faces of the nut, each planar chordal face lying in a plane parallel to a common longitudinal axis and being equidistantly spaced from the axis, the distance between the axis and the plane of each chordal face being greater than the distance between the axis and each face of the nut but less than the distance between the axis and each corner, whereby the cap may be slipped over the nut without interference in a first position when the faces of the nut are substantially parallel to the chordal faces, the cap including means for engagement with a torque applying tool for rotating the cap relative to the nut to a second position, the corners of the nut being in interference engagement with the chordal faces in the second position, the cap being lockingly engaged on the nut when the chordal faces are in interference engagement with the corners of the nut.

2. A molded thermoplastic nut cap as constructed in accordance with claim 1 wherein the interior wall of the body includes a fillet at the intersection of adjacent chordal faces whereby the wall is strengthened.

3. A molded thermoplastic nut cap as constructed in accordance with claim 1 wherein the chordal faces are symmetrically positioned about a longitudinal axis.

4. A molded thermoplastic nut cap as constructed in accordance with claim 1 further including an abutment rib, the abutment rib being positioned on a chordal face, the abutment rib having an innermost face spaced from the axis a distance less than the distance between the plane of a chordal face and the axis and more than the distance between the axis and a face of the nut, the abutment rib being so positioned on the chordal face as to contact the face of the nut when in the cap is in the second position, whereby a stop is provided for rotation of the nut cap.

5. A molded thermoplastic nut cap as constructed in accordance with claim 4 further including an abutment rib associated with each chordal face.

6. A molded thermoplastic nut cap as constructed in accordance with claim 1 wherein the means for engagement with a torque applying tool comprises means forming a plurality of planar faces on the exterior of the cap, the faces being arranged in polygonal plan configuration, the torque applying tool having a grip with a mating polygonal plan configuration.

7. A molded thermoplastic nut cap as constructed in accordance with claim 1 wherein the body includes an outwardly flared skirt at the open bottom.

8. A method of securing a wheel cover to a vehicle wheel with twist fasteners, the twist fasteners comprising lug nut caps as constructed in accordance with claim 1, the wheel being mounted to a vehicle with a plurality of lugs passing through apertures in the wheel and lug nuts engaged over the lugs and exerting an axial compressive force against the wheel, the method comprising the steps of:

(a) providing a plurality of lug nut openings axially through the wheel cover, the openings being registered with the lug nuts and being of a size to permit the wheel cover to be moved axially over all of the lug nuts without interference, (b) providing a plurality of lug nut caps constructed in accordance with claim 1, (c) slipping a lug nut cap over a lug nut with the lug nut cap being in the first position relative to the lug nut, (d) placing the open bottom of the cap body snugly against the wheel cover, (e) twisting the lug nut cap relative to the lug nut utilizing a torque applying tool to grip the means for engagement, (f) terminating the twisting step when the cap is in the second position relative to the lug nut, and (g) repeating the slipping, twisting and terminating step for each lug nut.

9. A molded thermoplastic nut cap as constructed in accordance with claim 1 wherein the cap is molded of a polyamide.

10. A molded thermoplastic nut cap as constructed in accordance with claim 9 wherein the polyamide comprises Zytel ST801 nylon.

11. A molded thermoplastic nut cap as constructed in accordance with claim 9 wherein the polyamide comprises high temperature 4-6 nylon.

12. A molded thermoplastic nut cap as constructed in accordance with claim 1, further including a metalized plating on the exterior surface of the cap.

13. A molded thermoplastic nut cap as constructed in accordance with claim 1 wherein the cap is molded of a thermoplastic having a colorant.

14. A wheel cover twist fastener system for a vehicle wheel secured by a plurality of lug nuts, the system including a wheel cover and a plurality of twist fasteners, each twist fastener comprising a nut cap constructed in accordance with claim 1, the wheel cover having a plurality of lug nut openings, each opening being of a size sufficient to permit the wheel cover to be slipped axially over the plurality of wheel lug nuts and placed in abutment against the wheel, each nut cap having its open bottom in abutment against the wheel cover and being in the second position relative to its respective lug nut.

* * * * *